(12) United States Patent
Yang

(10) Patent No.: US 8,614,948 B2
(45) Date of Patent: Dec. 24, 2013

(54) DATA TRANSMISSION METHOD, DATA RECEPTION METHOD AND APPARATUSES THEREOF

(75) Inventor: Tao Yang, Shanghai (CN)

(73) Assignee: Alcatel Lucent, Paris (FR)

( * ) Notice: Subject to any disclaimer, the term of this patent is extended or adjusted under 35 U.S.C. 154(b) by 817 days.

(21) Appl. No.: 12/665,076

(22) PCT Filed: Jun. 17, 2008

(86) PCT No.: PCT/CN2008/001176
§ 371 (c)(1),
(2), (4) Date: Dec. 17, 2009

(87) PCT Pub. No.: WO2008/154816
PCT Pub. Date: Dec. 24, 2008

(65) Prior Publication Data
US 2010/0189059 A1    Jul. 29, 2010

(30) Foreign Application Priority Data

Jun. 19, 2007  (CN) .......................... 2007 1 0042433

(51) Int. Cl.
*H04L 12/26*    (2006.01)
*H04J 3/16*    (2006.01)
(52) U.S. Cl.
USPC .......................................... 370/235; 370/468
(58) Field of Classification Search
None
See application file for complete search history.

(56) References Cited

U.S. PATENT DOCUMENTS

| 2003/0210676 | A1* | 11/2003 | Wu .............................. 370/350 |
| 2007/0291788 | A1* | 12/2007 | Sammour et al. ............. 370/466 |
| 2011/0317719 | A1* | 12/2011 | Vedantham et al. .......... 370/469 |

FOREIGN PATENT DOCUMENTS

WO        WO 02/15524 A1    2/2002

OTHER PUBLICATIONS

European Search Report for Appl. No. EP 08757453 dated Aug. 5, 2011.
Alcatel-Lucent. "Comparison of different SN handling at Layer 2", 3GPP Mobile Competence Centre, Jun. 22, 2007, vol. RAN WG2, No. Orlando, pp. 1-9.
Ericsson. "L2 Sequence No. in LTE", 3GPP Mobile Competence Centre, May 4, 2007, vol. RAN WG2, No. Kobe, Japan pp. 1-4.
Alcatel-Lucent. "RLC PDU structure in LTE" 3GPP Mobile Competence Centre, Jan. 12, 2007, vol. RAN WG2, No. Sorrento, pp. 1-5.

* cited by examiner

*Primary Examiner* — Eunsook Choi
(74) *Attorney, Agent, or Firm* — Fay Sharpe, LLP

(57) ABSTRACT

Disclosed is a data transmission method, data reception method and apparatus. The data transmission method comprises steps of: determining whether a plurality of PDCP PDUs are consecutive; mapping the plurality of PDCP PDUs to one RLC PDU when the plurality of PDCP PDUs are consecutive, wherein a PDCP SN of a first PDCP PDU among the plurality of PDCP PDUs is reserved, while PDCP SNs of the remaining PDCP PDUs are removed; and setting a flag bit in a RLC PDU's header as a first preset value to indicate that the plurality of PDCP PDUs are consecutive. With the methods and apparatus according to the present invention, radio resource in the mobile wireless communication systems can be saved since transmission of redundant information may be reduced.

6 Claims, 3 Drawing Sheets

DATA TRANSMISSION METHOD, DATA RECEPTION METHOD AND APPARATUSES THEREOF

CROSS-REFERENCE

This application is a National Stage entry of PCT International Application Number PCT/CN08/01176, filed on Jun. 17, 2008, and claims priority to and the benefit of CN 200710042433.3 filed Jun. 19, 2007.

BACKGROUND OF THE INVENTION

1. Field of the Invention

The present invention relates to the mobile communication technologies, particularly to a data transmission method, data reception method and corresponding apparatuses, with which radio resource consumption in the wireless communication systems can be reduced.

2. Description of Prior Art

In the Third Generation (3G) communication systems and the evolution of the 3G communication systems, the interface between an eNode B (also called a base station) and an UE (User Equipment) is usually called the "Uu" interface, via which data related with users is transmitted and received.

Each side of the eNode B and the UE is usually divided into a Packet Data Convergence Protocol (PDCP) layer, a radio link control (RLC) layer, a medium access control (MAC) layer and a physical layer. The PDCP layer, RLC layer and MAC layer are served as the second layer (L2 layer) in the Open Systems Interconnection (OSI) solutions, and the physical layer is served as the first layer (L1 layer) in the OSI solutions.

Data transmitted in the PDCP layer is called "PDCP PDU", which includes a serial number SN and a "PDCP SDU (PDCP Service Data Unit)". Data transmitted in the RLC layer is called "RLC PDU", which includes a RLC header and a "Data Part". Data transmitted in the MAC layer is called "MAC PDU", which includes a "MAC header" and a "MAC SDU".

In usual, each PDCP PDU has a PDCP serial number (PDCP SN). Such a serial number is necessary for the reception side, since it can guarantee that the PDCP at the reception side work normally, for example, the PDCP layer at the UE works correctly. FIG. 1 shows a mapping relationship between PDCP PDU and RLC SDU. In such a scenario, each PDCP PDU includes a PDCP SN and a PDCP SDU is mapped to one RLC SDU. Consecutive RLC SDUs have continuous PDCP SNs. A series of RLC SDUs are mapped to one RLC PDU sequentially. That is, a series of PDCP PDUs each comprising a PDCP SN and a PDCP SDU are mapped to one RLC PDU.

As shown in FIG. 1, for example, a PDCP PDU usually includes a necessary serial number such as SN_1 and a necessary data part such as PDCP SDU 1, which will be mapped into the RLC layer as a part of data units transmitted in that layer.

In such a scenario, taking the transmission side as an example, an operating procedure on the user plane is shown in FIG. 2. As shown in FIG. 2, a plurality of PDCP PDUs are mapped to a data part of one RLC data packet, for example, PDCP PDU_1 to PDCP PDU_n in Logical Channel_1 are mapped as RLC PDUs of the RLC layer data packets. In other words, each RLC PDU includes a RLC header and a RLC PDU data part formed by a plurality of PDCP PDUs.

As shown in FIG. 2, a plurality of RLC PDUs are mapped into the MAC layer as MAC SDUs of a MAC PDU, and further transmitted in the physical layer.

Therefore, one RLC PDU includes many continuous PDCP SNs in case PDCP PDUs are consecutive. However, due to the continuity of the PDCP PDUs, if a PDCP SN of a first RLC SDU is known, PDCP SNs of the subsequent RLC SDUs can be estimated automatically. In other words, there is redundancy in the mapping procedure from the PDCP layer to the RLC layer, which leads to radio resource waste.

SUMMARY OF THE INVENTION

In view of the above problems, the present invention is proposed. The object of the present invention is to provide a data transmission method, data reception method and corresponding apparatuses, which can save radio resource in the mobile wireless communication systems.

According to an aspect of the present invention, a data transmission method is provided, which comprises steps of: determining whether a plurality of PDCP PDUs are consecutive; mapping the plurality of PDCP PDUs to one RLC PDU when the plurality of PDCP PDUs are consecutive, wherein a PDCP SN of a first PDCP PDU among the plurality of PDCP PDUs is reserved, while PDCP SNs of the remaining PDCP PDUs are removed; and setting a flag bit in a RLC PDU's header as a first preset value to indicate that the plurality of PDCP PDUs are consecutive.

According to one embodiment of the present invention, the method further comprises steps of: mapping the plurality of PDCP PDUs to one RLC PDU when the plurality of PDCP PDUs are non-consecutive, wherein PDCP SNs of the plurality of PDCP PDUs are all reserved; and setting the flag bit in the RLC PDU's header as a second present value to indicate that the plurality of PDCP PDUs are non-consecutive.

According to one embodiment of the present invention, if a last part of one PDCP PDU is mapped to a RLC PDU, a PDCP SN of a PDCU PDU following the one PDCP is reserved in the RLC SDU, while PDCP SNs of the remaining PDCP PDUs are removed.

According to one embodiment of the present invention, if the RLC PDU only contains one segment of a PDCP PDU and this segment is not a first segment of the PDCP PDU, a PDCP SN of the PDCP PDU is not included in the RLC PDU.

In another aspect of the present invention, a data reception method is provided, which comprises steps of: determining whether a flag bit in a RLC PDU's header has been set as a first preset value or a second preset value; and adding a PDCP SN to each PDCP PDU sequentially except the first one included in the RLC PDU when the flag bit has been set as the first preset value.

According to one embodiment of the present invention, the method further comprising a step of resuming respective PDCP SNs sequentially based on the PDCP SNs of PDCP PDUs included in the RLC PDU, when the flag bit has been set as the second preset value.

In yet another aspect of the present invention, a data transmission method is provided, which comprises steps of: determining whether a plurality of PDCP PDUs are consecutive; mapping the plurality of PDCP PDUs to respective RLC PDUs when the plurality of PDCP PDUs are non-consecutive, wherein PDCP SNs of the plurality of PDCP PDUs are all reserved; and mapping the plurality of PDCP PDUs to one RLC PDU when the plurality of PDCP PDUs are consecutive, wherein a PDCP SN of a first PDCP PDU among the plurality of PDCP PDUs is reserved, while PDCP SNs of the remaining PDCP PDUs are removed.

In yet another aspect of the present invention, a data reception method is provided, which comprises steps of: determining whether a RLC PDU contains at least two PDCP PDUs; adding a PDCP SN to each PDCP PDU sequentially except the first one included in the RLC PDU if the RLC PDU contains at least two PDCP PDUs; and resuming respective PDCP PDUs directly from the RLC PDU if the RLC PDU does not contain at least two PDCP PDUs.

In yet another aspect of the present invention, a data transmission apparatus is provided, which comprises: a transmission control unit adapted to determine whether a plurality of PDCP PDUs are consecutive; and a mapping unit adapted to map the plurality of PDCP PDUs to one RLC PDU when the plurality of PDCP PDUs are consecutive, wherein a PDCP SN of a first PDCP PDU among the plurality of PDCP PDUs is reserved, while PDCP SNs of the remaining PDCP PDUs are removed. The transmission control unit is further adapted to set a flag bit in a RLC PDU's header as a first preset value to indicate that the plurality of PDCP PDUs are consecutive.

According to one embodiment of the present invention, the mapping unit maps a plurality of PDCP PDUs to one RLC PDU when the plurality of PDCP PDUs are non-consecutive, wherein PDCP SNs of the plurality of PDCP PDUs are reserved. The transmission control unit sets the flag bit in the RLC PDU's header as a second preset value to indicate that the plurality of PDCP PDUs are non-consecutive.

In yet another aspect of the present invention, a data reception apparatus is provided, which comprises: a reception control unit adapted to determine whether a flag bit in a RLC PDU's header has been set as a first preset value or a second preset value; and an inverse mapping unit adapted to add a PDCP SN to each PDCP PDU sequentially except the first one included in the RLC PDU, when the flag bit has been set as the first preset value.

According to one embodiment of the present invention, the inverse mapping unit resumes respective PDCP SNs sequentially based on PDCP SNs of PDCP PDUs included in the RLC PDU, when the flag bit has been set as the second preset value.

In yet another aspect of the present invention, a data transmission apparatus is provided, which comprises: a transmission control unit adapted to determine whether a plurality of PDCP PDUs are consecutive; and a mapping unit adapted to map the plurality of PDCP PDUs to respective RLC PDUs when the plurality of PDCP PDUs are non-consecutive, wherein PDCP SNs of the plurality of PDCP PDUs are all reserved, and map the plurality of PDCP PDUs to one RLC PDU when the plurality of PDCP PDUs are consecutive, wherein a PDCP SN of a first PDCP PDU among the plurality of PDCP PDUs is reserved, while PDCP SNs of the remaining PDCP PDUs are removed.

In yet another aspect of the present invention, a data reception apparatus is provided, which comprises: a reception control unit adapted to determine whether a RLC PDU contains at least two PDCP PDUs; and an inverse mapping unit adapted to add a PDCP SN to each PDCP PDU sequentially except the first one included in the RLC PDU if the RLC PDU contains at least two PDCP PDUs, and resume respective PDCP PDUs directly from the RLC PDU if the RLC PDU does not contain at least two PDCP PDUs.

With the configurations mentioned above, it may avoid transmitting vast redundant information via the air interface, so as to save radio resource while guaranteeing the PDCP layer at the reception side work correctly.

BRIEF DESCRIPTION OF THE DRAWINGS

The above features and advantages of the present invention will be apparent from the following detailed description in conjunction with the drawings in which.

DETAILED DESCRIPTION OF THE PREFERRED EMBODIMENTS

Figure 1:
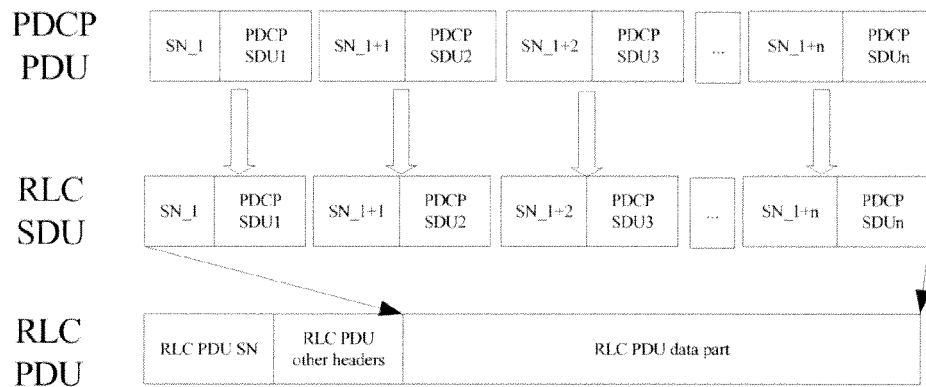
FIG. 1 shows a mapping relationship between a PDCP PDU and a RLC PDU.
Figure 2:
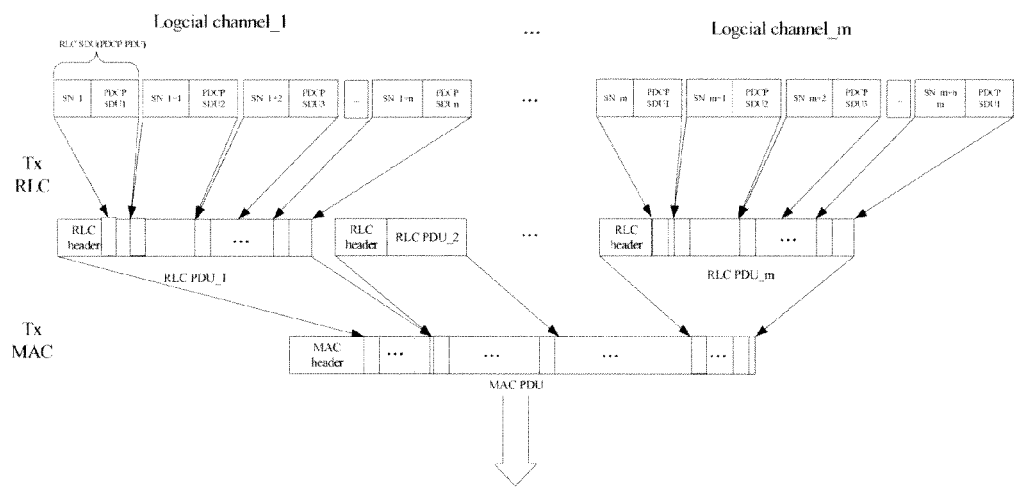
FIG. 2 shows an operating procedure of the LTE user plane according to the prior art.

In the following, a detailed description will be given to embodiments of the present invention with reference to the drawings. In the drawings, same reference numerals are used to indicate same or similar components throughout different drawings. For sake of clarity and simplicity, detailed descriptions to known functions and structures included here will be omitted, in order not to obscure the subject matter of the present invention.

Figure 3:
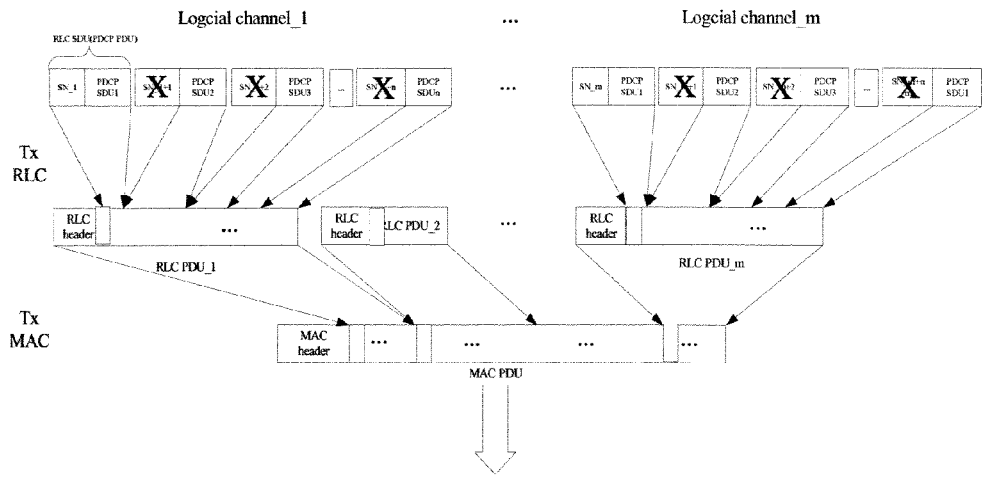
FIG. 3 shows a procedure for transmitting data via the Uu interface according to an embodiment of the present invention.

FIG. 3 shows a procedure for transmitting data via the Uu interface according to an embodiment of the present invention. As shown in FIG. 3, if PDCP PDUs are consecutive, only a first PDCP PDU among a series of PDCP PDUs is totally mapped to a RLC PDU, while PDCP SNs of the subsequent PDCP PDUs are removed. That is, the subsequent PDCP PDUs are concatenated sequentially following the first PDCP PDU, so as to form a RLC SDU.

In other words, when a first concatenated part in the PDCP layer may form a complete RLC PDU, the RLC PDU only carries a first PDCP SN with the remaining PDCP SNs removed.

When a first concatenated part in the PDCP layer is a last part of the RLC PDU, the RLC PDU carries a PDCP SN of a second concatenated part with the subsequent PDCP SNs removed.

Therefore, in above scenarios, one bit may be added in the RLC PDU's header as a flag bit, and the flag bit is set as 1 to indicate that the PDCP PDUs are consecutive. In this way, it may be determined at the reception side based on the value of the flag bit to adopt which manner to perform a mapping.

However, if the PDCP PDUs are non-consecutive, they are processed in accordance with the existing manners. Specifically, all the PDCP PDUs are mapped to a single RLC PDU, instead of removing PCDP SNs of any PDCP PDUs. In this case, the flag bit in the RLC PDU's header is set as 0 to indicate to the reception side that the PDCP PDUs are non-consecutive.

In addition, in case that the RLC PDU only contains one RLC SDU or other segments, if the PDCP SN is included in a first segment, that is, the RLC PDU only contains one segment and this segment is not the first segment of the original RLC SDU, then no PDCH SN is needed.

Figure 4:
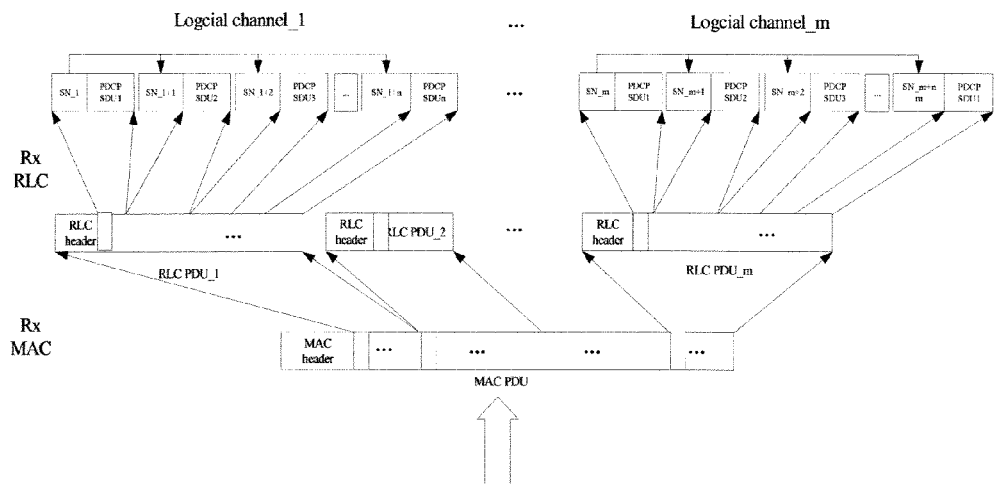
FIG. 4 shows a procedure for receiving data via the Uu interface according to an embodiment of the present invention.

FIG. 4 shows a procedure for transmitting data via the Uu interface according to an embodiment of the present invention. As shown in FIG. 4, if received RLC PDUs include more than one RLC PDU, when it is detected that a flag bit in the RLC PDU's header has bee set as 1, this means that the PDCP PDUs are consecutive. In this case, since a SN of a first RLC SDU is known, a SN is added to each RLC SDU sequentially except the first one. However, when it is detected that the flag bit in the RLC PDU's header has been set as 0, this means that the PDCP PDUs are not sequential and each PDCP PDU carries respective SNs, thus no SN is needed.

For example, if the flag bit has been set as 1, the reception side knows that the PDCP PDUs are consecutive. As shown in FIG. 4, after re-assembling the RLC PDU, a SN is added to each RLC SDU sequentially except the first one. If a first RLC SDU has a PDCP SN of n, a second RLC SDU has a PDCP SN of n+1, a third RLC SDU has a PDCP SN of n+2 and so forth. In this way, all the RLC SDUs are re-formed sequentially.

Since transmission of redundant information during the transmission via the air interface, radio resource may be saved.

The above description is for the operating procedures without any segmentation. In the following, operating procedures at the reception side and the transmission side when there are segmentations in the RLC PDU will be described.

If the RLC PDU only contains one RLC SDU segment and this segment is not the first segment, no PDCP SN is needed.

If the first concatenated part is the last segment of the RLC SDU, only a PDCP SN corresponding to the second concatenated part is included in the RLC PDU.

However, the reception side can differentiate these two special cases by segmentation information in the RLC PDU's header. For example, the segmentation information in the RLC PDU's header indicates a segment in the RLC SDU is a first segment of one PDCP PDU, that is, this segment contains a PDCP SN. In addition, the segmentation information in the RLC PDU's header may also indicate a segment in the RLC SDU is a last segment of one PDCP PDU.

In the above description, the PDCP PDUs are determined to be consecutive or non-consecutive using a flag bit. However, it is possible to determine whether the PDCP PDUs are consecutive or non-consecutive without using a flag bit.

For example, if a RLC PDU only contains a RLC SDU or other segments, there is no need to add a flag bit in the RLC PDU's header to indicate that the PDCP PDUs are consecutive or non-consecutive. This is because all RLC SDUs can be mapped to different RLC PDUs with respective PDCP SNs in the latter case.

If a RLC PDU contains two or more RLC SDUs or other segments, the reception side may know the PDCP PDUs are necessarily consecutive, thereby adding PDCP SNs to different RLC PDUs sequentially.

In this way, the reception side can differentiate whether the PDCP PDUs are consecutive or non-consecutive. In the former case, a PDCP SN of each PDCP PDU is transmitted without using the air interface, thereby saving radio resource.

For example, assuming the PDCP SN occupies 11 bits, N RLC PDUs are mapped to one MAC PDU, and Ni RLC SDUs are concatenated respectively in each RLC PDU, then totally $$\sum_{i=1}^{N}[(N_i-1)*PDCPSN] = \sum_{i=1}^{N}[(N_i-1)*11]$$

bits are saved.

Figure 5:
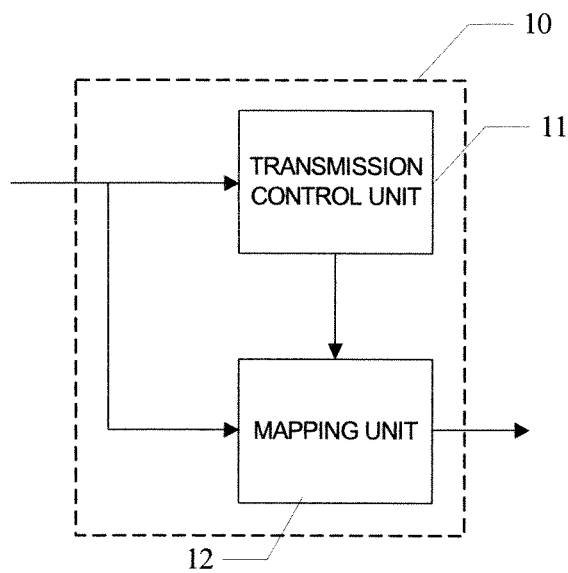
FIG. 5 shows a structural schematic of a transmission side according to an embodiment of the present invention.

FIG. 5 shows a structural schematic of a transmission side according to an embodiment of the present invention. As shown in FIG. 5, a transmission side 10 according to the embodiment of the present invention is provided with a transmission control unit 11 and a mapping unit 12.

A series of PDCP PDUs are input into the transmission control unit 11, which determines whether a RLC PDU contains at least two RLC SDUs.

In case the RLC PDU contains at least two complete RLC SDUs, if these RLC SDUs are consecutive, the mapping unit 12 only reserves a PDCP SN of a first RLC SDU among a plurality of RLC SDUs, which is included in the RLC PDU, while removing PDCP SNs of the subsequent RLC SDUs. In other words, the mapping unit 12 concatenates PDCP SUDs of the plurality of RLC PDUs while only reserving a SN of the first PDCP among these PDCP SDUs.

However, if the first concatenated part is the last segment of the RLC SDU, the mapping unit 12 makes the RLC PDU carry a PDCP SN of the second concatenated part while removing the subsequent PDCP SNs.

In addition, the transmission control unit 11 may set a flag bit in the RLC PDU's header as 1, so to indicate to the reception side that the PDCP PDUs are consecutive.

On the other hand, if these RLC SDUs are non-consecutive, the mapping unit 12 may concatenate all PDCP PDUs in one RLC PDU without removing any PDCP SNs. Additionally, the transmission control unit 11 may set the flag bit in the RLC PDU's header as 0, so as to notify the reception side that the PDCP PDUs are non-consecutive. In this case, the PDCP SNs will not be removed.

In case the RLC PDU only contains a RLC SDU or other segments, as mentioned above, since the RLC PDU header has segmentation information, it is unnecessary to use the flag bit in the RLC PDU's header.

Similarly, when the PDCP PDUs are non-consecutive, different PDCP SDUs may be mapped to corresponding RLC PDUs respectively with separate PDCP SNs. In this case, it is not necessary to notify the reception side whether the PDCP PDUs are consecutive or not.

Figure 6:
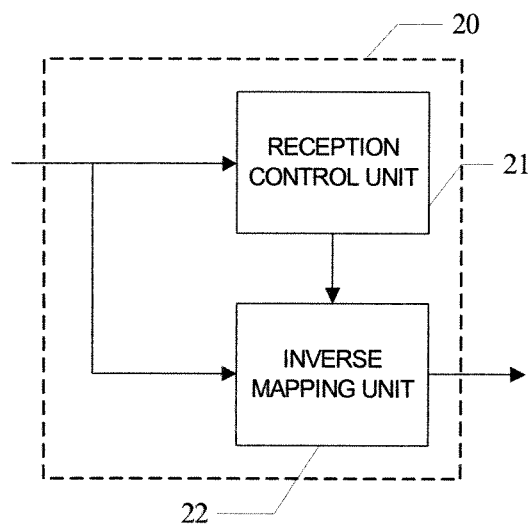
FIG. 6 shows a structural schematic of a reception side according to an embodiment of the present invention.

FIG. 6 shows a structural schematic of a reception side according to an embodiment of the present invention. As shown in FIG. 6, RLC PDUs resolved from the MAC layer are to be further resolved as data packets for corresponding logic channels, so as to facilitate subsequent processing. A reception side 20 according to the embodiment of the present invention is provided with a reception control unit 21 and an inverse mapping unit 22.

The reception control unit 21 firstly determines whether a flag bit in the RLC PDU's header has been set as 1 or 0, after receiving the RLC PDUs from the MAC layer.

If the flag bit has bee sent as 1, this means that the PDCP PDUs are consecutive. That is, the RLC PDU only contains a PDCP SN of a first PDCP PDU. Then, the inverse mapping unit 22 adds a PDCP SN to each PDCU PDU following the first PDCP PDU sequentially.

If the flag bit has been set as 0, this means that the PDCP PDUs are non-consecutive. That is, the RLC PDU contains respective PDCP PDUs and corresponding PDCP SNs. Thus, no PDCP SN is needed.

The above description explains the case in which the PDCP PDUs are non-consecutive and it is allowed to map a plurality of PDCP PDUs to one RLC PDU. However, if the PDCP PDUs are non-consecutive, but it is only allowed to map respective PDCP PDUs to corresponding RLC PDU in a manner of one to one, instead of mapping the plurality of PDCP PDUs to one RLC PDU, it is not necessary to use a flag bit. This is because once the reception control unit 21 knows that the RLC PDU contains more than one PDCP PDU, this means that the PDCP PDUs are consecutive and it is needed to add corresponding PDCP SNs.

As mentioned above, the reception side can differentiate whether the PDCP PDUs are consecutive or not. When the PDCP PDUs are consecutive, a PDCP SN of each PDCP PDU is transmitted without using the air interface, which may save radio resource.

The foregoing description gives only the embodiments for achieving the present invention. It shall be appreciated by those skilled in the art that any modifications, or partial substitutions made within the scope of the present invention shall fall into the scope of the present invention defined by Claims attached. Therefore, the scope of present invention shall be consistent with that of the claims.

What is claimed is:

1. A data transmission method comprising:
   determining whether a plurality of Packet Data Convergence Protocol (PDCP) Protocol Data Units (PDUs) are consecutive;
   mapping the plurality of PDCP PDUs to one Radio Link Control (RLC) PDU when the plurality of PDCP PDUs are consecutive, wherein a PDCP Serial Number (SN) of a first PDCP PDU among the plurality of PDCP PDUs is reserved, while PDCP SNs of the remaining PDCP PDUs are removed;
   setting a flag bit in a RLC PDU's header as a first preset value to indicate that the plurality of PDCP PDUs are consecutive;
   mapping the plurality of PDCP PDUs to one RLC PDU when the plurality of PDCP PDUs are non-consecutive, wherein PDCP SNs of the plurality of PDCP PDUs are reserved; and
   setting the flag bit in the RLC PDU's header as a second present value to indicate that the plurality of PDCP PDUs are non-consecutive, wherein, if a last part of one PDCP PDU is mapped to the RLC PDU, a PDCP SN of a PDCP PDU following the one PDCP PDU is reserved in the RLC SDU, while PDCP SNs of the subsequent PDCP PDUs are removed.

2. A data transmission method comprising:
   determining whether a plurality of Packet Data Convergence Protocol (PDCP) Protocol Data Units (PDUs) are consecutive;
   mapping the plurality of PDCP PDUs to one Radio Link Control (RLC) PDU when the plurality of PDCP PDUs are consecutive, wherein a PDCP Serial Number (SN) of a first PDCP PDU among the plurality of PDCP PDUs is reserved, while PDCP SNs of the remaining PDCP PDUs are removed; and
   setting a flag bit in a RLC PDU's header as a first preset value to indicate that the plurality of PDCP PDUs are consecutive wherein, if the RLC PDU only contains one segment of a PDCP PDU and this segment is not a first segment of the PDCP PDU, a PDCP SN of the PDCP PDU is not included in the RLC PDU.

3. A data transmission apparatus comprising:
   a transmission control unit adapted to determine whether a plurality of Packet Data Convergence Protocol (PDCP) Protocol Data Units (PDUs) are consecutive; and
   a mapping unit adapted to map the plurality of PDCP PDUs to one Radio Link Control (RLC) PDU when the plurality of PDCP PDUs are consecutive, wherein a PDCP Serial Number (SN) of a first PDCP PDU among the plurality of PDCP PDUs is reserved, while PDCP SNs of the remaining PDCP PDUs are removed,
   wherein the transmission control unit is further adapted to set a flap bit in a RLC PDU's header as a first preset value to indicate that the plurality of PDCP PDUs are consecutive, wherein, if a last part of one PDCP PDU is to be mapped to the RLC PDU, a PDCP SN of a PDCP PDU following the one PDCP PDU is reserved in the RLC PDU, while PDCP SNs of the subsequent PDCP PDUs are removed.

4. The apparatus according to claim 3, wherein the mapping unit is further adapted to map the plurality of PDCP PDUs to one RLC PDU when the plurality of PDCP PDUs are non-consecutive, wherein PDCP SNs of the plurality of PDCP PDUs are all reserved, and wherein the transmission control unit sets the flag bit in the RLC PDU's header as a second preset value to indicate that the plurality of PDCP PDUs are non-consecutive.

5. A data transmission apparatus comprising:
   a transmission control unit adapted to determine whether a plurality of Packet Data Convergence Protocol (PDCP) Protocol Data Units (PDUs) are consecutive; and
   a mapping unit adapted to map the plurality of PDCP PDUs to one Radio Link Control (RLC) PDU when the plurality of PDCP PDUs are consecutive, wherein a PDCP Serial Number (SN) of a first PDCP PDU among the plurality of PDCP PDUs is reserved, while PDCP SNs of the remaining PDCP PDUs are removed,
   wherein the transmission control unit is further adapted to set a flag bit in a RLC PDU's header as a first preset value to indicate that the plurality of PDCP PDUs are consecutive, wherein, if the RLC PDU only contains a segment of a PDCP PDU and this segment is not a first segment of the PDCP PDU, a PDCP SN of the PDCP PDU is not included in the RLC PDU.

6. The apparatus according to claim 5, wherein the mapping unit is further adapted to map the plurality of PDCP PDUs to one RLC PDU when the plurality of PDCP PDUs are non-consecutive, wherein PDCP SNs of the plurality of PDCP PDUs are all reserved, and wherein the transmission control unit sets the flag bit in the RLC PDU's header as a second preset value to indicate that the plurality of PDCP PDUs are non-consecutive.

* * * * *